3,822,119
ANTI-POLLUTION ANTI-KNOCK GASOLINE
Kenneth J. Frech, Tallmadge, and James J. Tazuma, Stow, Ohio, assignors to The Goodyear Tire & Rubber Company, Akron, Ohio
No Drawing. Continuation-in-part of abandoned application Ser. No. 91,187, Nov. 11, 1970. This application May 21, 1971, Ser. No. 145,950
Int. Cl. C10l 1/32
U.S. Cl. 44—51                    9 Claims

ABSTRACT OF THE DISCLOSURE

There is disclosed a method of providing high octane anti-knock gasoline, without utilizing lead compounds, which when utilized in a typical automotive internal combustion engine, will significantly reduce the levels of objectionable and, in some cases, dangerous atmospheric pollutants. Also disclosed are mixtures of certain alcohols, water and gasoline hydrocarbons which have a sufficient octane rating but at the same time, exhibit lower emission level. Specifically, the method comprises the combined use of typical gasoline hydrocarbons, certain specific alcohols and water. The anti-pollution fuel and methods of utilizing the same are also disclosed.

---

This application is a continuation-in-part of application Ser. No. 91,187, filed Nov. 11, 1970 now abandoned, for "Anti-Knock Gasoline."

This invention is directed to an anti-pollution fuel or gasoline and methods of providing a high octane anti-knock gasoline without the use of lead compounds. More specifically, it comprises the combined use of typical gasoline hydrocarbons, specific alcohols and water.

The extent of pollution of our environment has reached serious proportions. In particular, atmospheric pollution in and around urban areas has reached levels which are a threat to the populace.

A major source of air pollution has been identified as the internal combustion engine. The problems associated with decreasing the extent of this type of pollution are numerous and complex.

One class of pollutants found in the effluent from internal combustion engines are lead salts. These lead salts are the result of the use of lead compounds, such as tetraethyl lead (TEL) and tetramethyl lead (TML) in gasoline which have been found necessary to increase the octane number and/or anti-knock characteristics of the gasoline to meet performance requirements imposed by high compression ratio engines. High compression ratio engines have more than prestigious values, they improve thermal efficiency which may be translated into better mileage at a constant level of performance.

This lead salt type of pollution is now receiving such adverse publicity that the use of such lead compounds in gasoline will probably be banned or at least fall into disrepute.

However, at the present ime, no other anti-knock agents are comparable to these lead compounds, from either performance or economic standpoints. Removal of these agents, therefore, from gasoline spawns a host of new problems. At present, two solutions to their removal have occurred to the auto manufacturers and to the oil industry.

The approach taken by the auto manufacturers is to redesign the engines of new autos so as to significantly decrease the compression ratio and the fuel octane requirements.

However, this approach results in poorer gasoline economy and poor energy utilization both at a time when we are becoming "energy short." Also, there are millions of older autos in use that have high-compression engines.

The approach taken by the gasoline producers is to increase the level of high-octane number hydrocarbon gasoline components to compensate for the removal of the TEL or TML. The aromatic content of the gasoline has been increased by some to provide a gasoline which can still be used in high compression ratio engines of the present autos.

The difficulties with the approach taken by the gasoline producers, that is, to increase the aromatic component of gasoline, are numerous. To increase the aromatic content of gasoline requires a substantial outlay of additional capital to provide additional catalytic reforming capability. This additional capital requirement will obviously be translated into additional cost to the consumer.

The use of higher aromatic levels in gasoline will lead to rough, noisy engine operation known as "engine thud" which reduces the engine efficiency. Further, the use of higher aromatic levels in gasoline accelerates the rate of engine sludge formation which in turn adds to poorer performance of the engine. Also, aromatics, particularly the higher levels, have a low resistance to surface ignition and, consequently, increase the amount of deposits formed during combustion. When internal combustion engines become fouled, there is an increased potential for air pollution. A significant amount of this pollution would be due to carbon monoxide, unburned hydrocarbons and partially oxidized hydrocarbons.

Probably the most dangerous pollutants to be emitted from engines burning gasoline containing a high percentage of aromatics are the unburned aromatics themselves which would be emitted. The tendency also to form carcinogenic agents, such as benzpyrene and other condensed aromatics, are far more likely to be produced if the aromatic content of gasoline is increased. Still another class of pollutants which are presently being emitted at rather high levels are the oxides of nitrogen.

It may be said, then, that either of these solutions are inadequate, one leading to poor energy utilization and the other eventually leading to greater environmental deterioration then presently attributed to lead compounds in gasoline.

The use of lead compounds in gasoline has resulted in a growing list of additives which are currently being incorporated into gasoline to help take care of the problems associated with these lead compounds. Thus, the removal of lead compounds should reduce or eliminate the need for these additives, however. For instance, in addition to lead, certain phosphorous containing compounds are added to gasoline. The function of the phosphorous compounds is to convert the residual lead to lead phosphate. Another reason for the addition of phosphorous compounds is to prevent pre-ignition. Certain boron compounds are added to gasoline which act as lead scavengers and promote or facilitate the removal of lead deposits from the engine. At present, most gasolines contain antioxidants. These antioxidants are aromatic amines or phenols which prevent oxidation. The amine compound functions also to act as a sweetener i.e. the conversion of sulfur compounds, such as mercaptans to disulfides. Another function of these antioxidants is to prevent the formation of peroxides which react with the lead additives and/or residues to form lead salts.

It is, therefore, the object of this invention to provide a method of producing an anti-knock gasoline while maintaining the high octane number. Another object is to reduce the emission pollutants to a level not heretofore obtainable using a typical leaded or even a non-leaded gasoline without sacrificing anti-knock performance. Still another object is to reduce the amount of nitrogen oxides, carbon monoxides, lead salts and other residues resulting from additives presently being used. Another object is to permit the continued use of high compression ratio engines thereby taking advantage of the high thermal efficiency which at a constant performance level, means higher gasoline mileage and, thus, better use of our limited natural resources. Still another object is to reduce engine deposit formation thereby providing high fuel economy and longer engine life and providing for effecting lead removal without sacrificing fuel value. Still another object is to reduce and control the unwanted engine phenomena known as auto ignition, pre-ignition, surface ignition, wild ping, rumble, run-on, and the like, all of which lead to poor fuel economy, the emission of more pollutants and a decrease in engine life. Another object is to reverse the industry trend toward inclusion of more and more aromatic constituents in gasoline which in turn may well lead to further environmental deterioration which could be more serious and more insidious than that caused by the present lead compounds.

According to the invention, a mixture of gasoline hydrocarbons, alcohols containing 4 to 8 carbon atoms and water provide a fuel which will enhance the performance characteristics of the typical internal combustion engine and, at the same time, will reduce the emissions which constitute the oxides of nitrogen, carbon monoxide and unburned hydrocarbons.

It is believed that the combination of, for instance, tertiary butyl alcohol and water in a typical gasoline base stock is a practical and economical method of solving some of the problems presently facing us today relative to use of the internal combustion engine. Tertiary butyl alcohol can be easily manufactured by simply contacting isobutylene with water in the presence of a suitable catalyst at moderate temperatures and pressures. A suitable catalyst for this conversion might be an organic ion exchange resin, such as sulfonated polystyrene-divinyl benzene, which are maintained in an acidic hydrogen form. Suitable reaction temperatures for the conversion of isobutylene and water to tertiary butyl alcohol fall in the range of from 150° F. to 350° F., and the pressures would probably be in the range of from 50 to 200 p.s.i.g. Large supplies of isobutylene are available in the refining industry and such a chemical operation should compare favorably with any other refinery processes customarily employed to obtain high octane gasolines, such as catalytic cracking, catalytic reforming, catalytic alkylation and isomerization.

The use of isopropyl alcohol plus water in combination with typical gasoline hydrocarbon base stocks also appears attractive both from a functional and economic standpoint. The precursor of isopropyl alcohol, propylene, is plentiful but is somewhat more difficult to convert than is isobutylene.

The use of normal propyl alcohol and water with typical gasoline hydrocarbons also appears to be both functionally and economically sound.

We also propose that under the right circumstances, two or more alcohols plus water might be added to the gasoline and may prove more useful than a single alcohol plus water.

We also propose that it may be advantageous to use more commercial alcohols, such as methanol or ethanol, with the aforementioned alcohols as additives to gasoline.

In addition, the logical precursor for isobutylene, isobutane, is quite plentiful. The increased use of hydrocracking coupled with depressed use for isobutylene has lead to this situation. In the event that these large quantities would prove insufficient for providing tertiary butyl alcohol requirements of this invention, the technology exists (with proper motivation to quickly remedy this situation).

Other alcohols containing from 4 to 8 carbon atoms should not be too expensive for use in the practice of this invention.

Tertiary butyl alcohol can also be obtained as a by-product from propylene oxide manufacture.

The same arguments can be advanced for the employment of tertiary amyl alcohol plus water.

In present day automobiles, the principle mode of fuel introduction into the internal combustion engine is by the use of a carburetor which serves to vaporize and mix with air and distribute evenly into a manifold the gasoline and air mixture to each cylinder. Another procedure which is less used is to directly feed the fuel to each cylinder by what is known as fuel injection. Therefore, it is obvious that a variety of mechanical procedures could be utilized to practice this invention. For instance, the given amount of alcohol and water employed could be mixed in a single tank and the present day carburetion system be employed. On the other hand, the individual components, that is, the gasoline hydrocarbons, the water, and at least one alcohol having from 4 to 8 carbon atoms, could be injected individually to each cylinder.

On the other hand, one could, in extremely low temperature situations, mix the alcohols and water in one tank and the gasoline in another and inject these two mixtures into each cylinder.

Before concentrating on the anti-pollution effects of incorporating these alcohols and water into gasoline, we will present the effect on anti-knock performance of these compounds as determined by octane ratings. Blends of various alcohols and/or water were mixed with a base lead-free gasoline feedstock and the Research Octane Number obtained thereon.

EXPERIMENT I

To obtain the samples tested, 15 liters of a typical no-lead premium gasoline having a research octane number of 101 was combined with 4 liters of normal heptane to give a gasoline having an 86 Research Octane Number as the blending stock. To this 86 octane gasoline was blended the various amounts of alcohols and water, as indicated in Table 1. The Research Octane Numbers set forth in Table 1 were obtained in the conventional manner.

TABLE 1.—OCTANE RATINGS

| No. | Fuel | Research Octane Number (RON) |
|---|---|---|
| 1 | Base gasoline (all hydrocarbon) | 86.0 |
| 2 | Base blend (90 vol. percent)-i-propyl alcohol (10 vol. percent) | 90.1 |
| 3 | Base blend (80 vol. percent)-i-propyl alcohol (20 vol. percent) | 94.0 |
| 4 | Base blend (70 vol. percent)-i-propyl alcohol (30 vol. percent) | 97.6 |
| 5 | Base blend (60 vol. percent)-i-propyl alcohol (40 vol. percent) | 101.2 |
| 6 | Base blend (90 vol. percent)-t-butyl alcohol (10 vol. percent) | 88.8 |
| 7 | Base blend (80 vol. percent)-t-butyl alcohol (20 vol. percent) | 91.3 |
| 8 | Base blend (70 vol. percent)-t-butyl alcohol (30 vol. percent) | 95.6 |
| 9 | Base blend (60 vol. percent)-t-butyl alcohol (40 vol. percent) | 97.8 |
| 10 | (Base blend (90 vol. percent)-IPA (10 vol. percent))-$H_2O$ (0.3 vol. percent) | 90.0 |
| 11 | (Base blend (80 vol. percent)-IPA (20 vol. percent))-$H_2O$ (1.3 vol. percent) | 94.2 |
| 12 | (Base blend (70 vol. percent)-IPA (30 vol. percent))-$H_2O$ (3.2 vol. percent) | 98.3 |
| 13 | (Base blend (60 vol. percent)-IPA (40 vol. percent))-$H_2O$ (6.0 vol. percent) | 102.5 |
| 14 | (Base blend (90 vol. percent)-TBA (10 vol. percent))-$H_2O$ (0.3 vol. percent) | 89.0 |
| 15 | (Base blend (80 vol. percent)-TBA (20 vol. percent))-$H_2O$ (0.8 vol. percent) | 91.8 |
| 16 | (Base blend (70 vol. percent)-TBA (30 vol. percent))-$H_2O$ (2.0 vol. percent) | 95.9 |
| 17 | (Base blend (60 vol. percent)-TBA (40 vol. percent))-$H_2O$ (3.2 vol. percent) | 98.0 |
| 18 | Eighty-six octane gasoline plus 3 ml. TEL | 95.0 |

NOTE.—I A=Isopropyl alcohol; TBA=t-Butyl alcohol.

Thus, it is obvious that the use of alcohols, such as isopropyl, tertiary butyl and tertiary amyl, when mixed with a typical gasoline blend, will increase the octane rating in a manner. It should also be noted that there is no decrease in the octane rating when water is added to this mixture.

Please note that the base fuel used in these experiments had a Research Octane Number several units below that which is usually available in a modern refinery. Thus, it is reasonable to assume that the Research Octane Numbers set forth in the table above could clearly be improved by three or four Research Octane Numbers. It is believed that the invention disclosed and claimed in this application will provide a method by which older automobiles, which contain internal combustion engines of high compression ratios, can still be operated on a knock-free unleaded, gasoline.

Furthermore, the use of water in these gasoline-alcohol blends will lead to a cool flame combustion resulting in lower levels of nitrogen oxide emissions, less engine deposits and the like.

As indicated previously, various alcohols containing from 4 to 8 carbon atoms along with water can be utilized in the practice of this invention. Representative examples of such alcohols are tertiary butanol, 2-methyl-2-pentanol, 2,3-dimethyl-2-butanol, 2-butanol, 2-pentanol, 3-pentanol, 3-methyl-2-pentanol, 4-methyl-2-pentanol, 4-methyl-3-pentanol, tertiary pentanol, 2,5-dimethyl hexanol, cyclohexanol, cumyl alcohol, the oxo-alcohol and various isoalcohols. Of these alcohols, it is preferred to employ tertiary butyl and tertiary amyl. As can be ascertained, certain of these alcohols containing from 4 to 8 carbon atoms are somewhat insoluble in water. If it is desired to employ these alcohols, then up to 40 percent of simple alcohols, such as methyl alcohol, ethyl alcohol, or n-propyl or isopropyl alcohol can be employed as a solubilizing agent.

The amounts of alcohols employed in the fuels of the present invention may range from about 2 to about 70 volume percent with a more preferred range of from about 5 to about 40%. All volumes referred to are based on the total volume of the fuel blend including water, the alcohol and the hydrocarbon stock and even other additives, if necessary.

The certain alcohols within the scope of this invention do not solubilize water to well. Thus, if any of the other alcohols falling within the scope of this invention are employed, it should be realized that the water contained would have to be adjusted downward to about 10% in order to have a one-phase system. However, such alcohols as methyl, ethyl and isopropyl could be added in addition to the alcohols of the invention up to about 40% and thus solubilize the water in the fuel mixture.

If normal propyl or isopropyl alcohol are employed, it is usually desirable to employ from about 5 to about 40% volume of alcohol with about 0.3 to 25% by volume of water.

Thus, if one desires to employ a one-phase system, such as a blended gasoline fuel, the overall alcohol contained could range from about 2 to about 70 volume percent and the water contained from about 0.1 to about 10%.

However, in the total concept of this invention, it is not necessary to employ the fuel as a one-phase system. The individual components could be injected separately or two or more mixed and injected as a two-component system. Thus, it could be said that the preferred range of alcohol is from about 2 to about 70 volume percent with about 5 to about 40 volume percent being more preferred and a most preferred range being from about 10 to about 30. The preferred range of water could be said to be from about 0.1 to about 25 volume percent with a more preferred range being from about 1 to 15 volume percent and a most preferred range being from about 2 to about 10 volume percent.

It is obvious to those skilled in the art that use of the amounts of water in a present-day gasoline blend even with the addition of the alcohol, these amounts range up to 25% would result in a two-phase system, simply because the water would not be soluble in the hydrocarbon/alcohol mixture. In the practice of this invention wherein larger volumes of water beyond that which would ordinarily be miscible or soluble in the alcohol hydrocarbon mixture, one could resort to such expedience as direct injection of water into the internal combustion engine or a water-alcohol mixture into each cylinder or to the carburetor. One could also use agents which are capable of solubilizing all of the components over the wide range of compositions contemplated.

Certain additives could or would probably be used along with the gasoline/alcohol/water blends or fuels of this invention. Such things as surface active agents could be used to prevent corrosion of the fuel systems and to promote the removal of any carburetor deposits or the prevention of any carburetor deposits as well as the prevention and removal of deposits on the intake manifold, or of the cylinders themselves.

Rust preventive additives would or could be used with this invention. Such rust preventives could be surfactants which function by forming a film on the surface of the metal subject to the corrosion. Preferred types would be alcohol surfactants and carboxylic acid surfactants.

If desired, certain antioxidants could also be added to the fuel or gasoline of this invention.

EXPERIMENT II

To determine that the practice of this invention will provide fuels which not only have the proper anti-knock characteristics, which have been previously illustrated in Table 1, but also that the fuels or gasoline blends have anti-pollution or anti-emission characteristics, the following tests were conducted. To a commercial gasoline having a Research Octane Number of 101 was added sufficient normal heptane to reduce the Research Octane Number to 90. To this 90 Octane gasoline was added water and alcohol as indicated in Table 2. These fuels were employed to operate typical conventional internal combustion engine. The automobile employed was a 1969 V-8 Dodge, equipped with a 318 cubic inch engine, which had been previously run for approximately 26,600 miles. The fuels were added to special tanks and the automobile placed on a dynamometer for a period of 17 minutes and driven through a conventional cycle, that is, idle, acceleration, deceleration, etc.

Samples of the exhaust were collected and diluted with nitrogen in a volume of 5/1. The amount of nitrogen oxides, carbon monoxides and unburned hydrocarbons were determined by conventional procedures. In Table 2 these pollutants are reported in parts per million. The Octane Research Numbers reported were obtained by calculations as opposed to actual determination. Please note a standard commercial fuel of 95-97 Octane was run as a control.

TABLE 2.—POLLUTANTS IN AUTO EXHAUST

| | Alcohol, percent | Vol. percent $H_2O$ | NOx | CO | Unburned hydrocarbons | Octane No. R.N. |
|---|---|---|---|---|---|---|
| Blend: | | | | | | |
| 1 | Isopropyl, 10 | 0.3 | 500 | 1,020 | 440 | 95 |
| 2 | t-Butyl, 10 | 0.2 | 500 | 1,100 | 450 | 95 |
| 3 | Isopropyl, 20 | | 480 | 820 | 405 | 98 |
| 4 | t-Butyl, 20 | | 500 | 1,160 | 410 | 98 |
| 5 | Isopropyl, 20 | 1.30 | 460 | 880 | 448 | 98 |
| 6 | t-Butyl, 20 | 0.7 | 460 | 880 | 402 | 98 |
| 7 | Isopropyl, 30 | 3.0 | 380 | 400 | 330 | 100+ |
| 8 | t-Butyl, 30 | 1.8 | 400 | 380 | 337 | 100+ |
| 9 | Isopropyl, 40 | 5.7 | 292 | 710 | 295 | 100+ |
| 10 | t-Butyl, 40 | 3.0 | 348 | 365 | 363 | 100+ |
| Control | Standard gasoline, 95-97 octane | | 500 | 1,900 | 575 | 95-97 |

In order to more clearly illustrate that the fuels of this invention, when employed as fuels for conventional internal combustion engines result in improved emissions from the exhaust, the following calculations were made: In Table 3 are reported the percent reduction relative to the standard fuel now employed in the United States. The numbers represent the improvement in $NO_x$, CO and unburned hydrocarbons, reported in percent reduction from that of the control standard commercial fuel.

TABLE 3

| Blend | Alcohol, vol. percent ** | $H_2O$, vol. percent | Octane No. Research | Reduction: Percent relative to standard * | | |
|---|---|---|---|---|---|---|
| | | | | $NO_x$ | CO | Unburned hydrocarbons |
| 1 | IP, 10 | 0.3 | | | 46.3 | 14.6 |
| 2 | TB, 10 | 0.2 | | | 42.1 | 12.6 |
| 3 | IP, 20 | | 4.0 | | 57.0 | 21.4 |
| 4 | TB, 20 | | | | 38.9 | 20.4 |
| 5 | IP, 20 | 1.3 | | 8.0 | 53.7 | 13.0 |
| 6 | TB, 20 | 0.7 | | 8.0 | 53.7 | 22.0 |
| 7 | IP, 30 | 3.0 | | 24.1 | 79.1 | 35.9 |
| 8 | TB, 30 | 1.8 | | 20.0 | 80.0 | 34.6 |
| 9 | IP, 40 | 5.7 | | 41.7 | 62.8 | 42.8 |
| 10 | TB, 40 | 3.0 | | 30.4 | 80.8 | 29.5 |

* Standard fuel=95-97 octane: 500 plus p.p.m. $NO_x$, 1,900 p.p.m. CO and 515 p.p.m. unburned hydrocarbons.
** IP is isopropyl alcohol; TB is t-butyl alcohol.

It can be ascertained that reductions in nitrogen oxide emissions greater than 40 percent, reductions in carbon monoxide emissions more than 80 percent, and a reduction in unburned hydrocarbons of more than 40 percent, can be obtained in the practice of this invention.

This invention can be employed in gasolines which are now commercially available or which may be available in the future. These gasolines may be the result of reforming which makes the gasolines considerably high in aromatic hydrocarbon content; these gasolines may be the result of alkylations which result in a higher percentage of branched-chain paraffins; these gasolines may be the result of isomerization reactions in which the paraffins are isomerized to more highly branched materials or the gasolines may be the result of hydrocracking operations which also result in larger quantities of branched-chain paraffins being present or catalytic cracking which results in an increase of both branched paraffins and branched olefins.

While certain representative embodiments and details have been shown for the purpose of illustrating the invention, it will be apparent to those skilled in this art that various changes and modifications may be made therein without departing from the spirit or scope of the invention.

What is claimed is:

1. An anti-pollution fuel suitable for use in an internal combustion engine consisting essentially of (1) a typical gasoline hydrocarbon base stock, (2) at least one alcohol containing from 4 to 8 carbon atoms, and (3) water, in which the amount of alcohol ranges from about 5 to about 40 volume percent, the amount of water ranges from about 0.1 to about 25 volume percent.

2. A fuel according to claim 1 in which the alcohol is employed in amounts of about 5 to about 40 volume percent and the water is employed in amounts of about 0.1 to about 10 volume percent.

3. A fuel according to claim 1 in which the alcohol is tertiary butyl or tertiary amyl.

4. A fuel according to claim 2 in which the alcohol is tertiary butyl or tertiary amyl.

5. A fuel according to claim 1 which also contains methyl, ethyl or isopropyl alcohol.

6. A method of lowering the amounts of atmospheric pollutants emitted from internal combustion engines which comprises providing as a fuel, a mixture consisting essentially of (1) a typical gasoline hydrocarbon base stock, (2) at least one alcohol containing from 4 to 8 carbon atoms and (3) water, in which the amount of alcohol ranges from about 5 to about 40 volume percent, the amount of water ranges from about 0.1 to about 25 volume percent.

7. A method according to claim 6 in which the fuel contains methyl, ethyl or isopropyl alcohol.

8. A method according to claim 6 in which the alcohol is tertiary butyl or tertiary amyl.

9. A method according to claim 6 in which the alcohol is employed in amounts of about 5 to about 40 volume percent and the water is employed in amounts of about 0.1 to about 10 volume percent.

References Cited

UNITED STATES PATENTS

| | | | |
|---|---|---|---|
| 2,078,736 | 4/1937 | Schurink | 44—56 |
| 2,218,137 | 10/1940 | Pyzel | 44—56 |
| 2,637,635 | 5/1953 | McLaughlin et al. | 44—56 |

DANIEL E. WYMAN, Primary Examiner

Y. H. SMITH, Assistant Examiner

U.S. Cl. X.R.

44—56

Disclaimer 3,822,119.—*Kenneth J. Frech,* Tallmadge and *James J. Tazuma,* Stow, Ohio. ANTI-POLLUTION ANTI-KNOCK GASOLINE. Patent dated July 2, 1972. Disclaimer filed July 8, 1981, by the assignee, *The Goodyear Tire & Rubber Co.*

Hereby enters this disclaimer to claims 1 through 9 of said patent

[*Official Gazette Sept. 15, 1981.*]